US007693985B2

(12) United States Patent
Keohane et al.

(10) Patent No.: US 7,693,985 B2
(45) Date of Patent: Apr. 6, 2010

(54) TECHNIQUE FOR DISPATCHING DATA PACKETS TO SERVICE CONTROL ENGINES

(75) Inventors: Michael Keohane, Shrewsbury, MA (US); Guy Fedorkow, Bedford, MA (US); Gaash Hazan, Kfar Saba (IL); Ori Finkelman, Tel-Aviv (IL); Ofer Weill, Modi'in (IL)

(73) Assignee: Cisco Technology, Inc., San Jose, CA (US)

( * ) Notice: Subject to any disclaimer, the term of this patent is extended or adjusted under 35 U.S.C. 154(b) by 677 days.

(21) Appl. No.: 11/450,929

(22) Filed: Jun. 9, 2006

(65) Prior Publication Data

US 2007/0288615 A1    Dec. 13, 2007

(51) Int. Cl.
G06F 15/173 (2006.01)
G06F 15/16 (2006.01)
H04L 12/28 (2006.01)

(52) U.S. Cl. .................. 709/224; 709/249; 370/389
(58) Field of Classification Search .......... 370/392, 370/351; 709/223
See application file for complete search history.

(56) References Cited

U.S. PATENT DOCUMENTS

| 6,633,560 | B1* | 10/2003 | Albert et al. ............. 370/351 |
| 6,687,222 | B1 | 2/2004 | Albert et al. |
| 6,891,839 | B2 | 5/2005 | Albert et al. |
| 6,970,913 | B1 | 11/2005 | Albert et al. |
| 7,051,066 | B1 | 5/2006 | Albert et al. |
| 7,222,188 | B1* | 5/2007 | Ames et al. ............... 709/238 |
| 2004/0095934 | A1* | 5/2004 | Cheng et al. ............. 370/390 |
| 2006/0109802 | A1* | 5/2006 | Zelig et al. ............... 370/258 |
| 2007/0058632 | A1* | 3/2007 | Back et al. ............... 370/392 |

OTHER PUBLICATIONS

"Configuring Firewall Load Balancing", Cisco Application Control Engine Module Server Load-Balancing Configuration Guide, Chapter 6, pp. 1-38.
"Configuring Firewall Load Balancing", Cisco Content Services Switch Advanced Configuation Guide, Chapter 9, pp. 1-10.
"Scaling the Internet Edge: Firewall Load Balancing", Cisco Systems, Inc., Mar. 2004, pp. 1-18.

(Continued)

Primary Examiner—Patrice Winder
Assistant Examiner—Taylor Elfervig
(74) Attorney, Agent, or Firm—Hamilton Brook Smith & Reynolds, P.C.

(57) ABSTRACT

A dispatching technique dispatches packets to a plurality of service control engines (SCEs) which in aggregate may be configured to handle traffic produced by a high-speed high-capacity data link. Upstream and downstream packets that are associated with a data flow between a subscriber and a destination node in a communication network are received from by a dispatcher which is located in a path used by the data flow. For each packet, the dispatcher identifies an SCE from among a plurality of SCEs that is to receive the packet based upon an address contained in the packet. The packet is then dispatched by the dispatcher to the identified SCE which processes the packet accordingly. After processing the packet, the SCE returns the packet to the dispatcher which further processes the packet including transferring the packet onto the communication network towards its destination.

15 Claims, 12 Drawing Sheets

OTHER PUBLICATIONS

"Firewall Load Balancing with One CSM Configuration Example", Cisco Systems, Inc.. 1992-2004, 9 pages.

"Firewall Load Balancing Configuration on the CSS 11000", Cisco Systems, Inc., 1992-2003, 7 pages.

"DataPipe- Managed Hosting Services—Load Balancing" Jan. 20, 2006, 2 pages.

"Approaches to Controlling Peer-to-Peer Traffic: A Technical Analysis", P-Cube, Inc., 1999-2003, pp. 1-9.

"The Power to Analyze, Control and Profit", Service Engine 2000, P-Cube, Inc., 1999-2004, 2 pages.

"P-Cube Service Application—Engage version 2.1", Engage Datasheet, P-Cube, Inc., 1999-2004, pp. 1-2.

"Service Engine 1000", P-Cube, Inc., 2 pages.

"Controlling Peer to Peer Bandwidth Consumption", P-Cube, Inc., 1999-2003, pp. 1-11.

"Service Engine 100", P-Cube, Inc., 2 pages.

"P-Cube® Engage P2P Control Solution For ISPs", Engage P2P Datasheet, P-Cube, Inc., 1999-2003, 2 pages.

"P-Cube® Engage: Tiered Service Control", Engage Tiered Services, P-Cube, Inc., 1999-2003, pp. 1-2.

"Assessing The Impact of Spam Zombies On Broadband Service Providers", Cisco Systems, Inc., 1992-2005, 9 pages.

"Bridging The Infrastructure Gap: The Importance of Service Control in Broadband Networks", Cisco Systems, Inc., 1992-2004, 7 pages.

"Cisco Service Control Application For Broadband-Usage Analysis and Reporting", Cisco Systems, Inc., 1992-2005, 11 pages.

"Service Control: The Next Step In Networking For Cable Operators", Cisco Systems, Inc., 1992-2004, 8 pages.

"Managing Peer-To-Peer Traffic With Cisco Service Control Technology", Cisco Systems, Inc. 1992-2005, 8 pages.

"Gigabit Ethernet", Ethernet Channel, Cisco Systems, Inc., 1992-2005, pp. 1-4.

* cited by examiner

TECHNIQUE FOR DISPATCHING DATA PACKETS TO SERVICE CONTROL ENGINES

FIELD OF THE INVENTION

This invention relates to communication networks and in particular to dispatching data packets to service control engines (SCEs) in a communication network.

BACKGROUND OF THE INVENTION

A communication network is a geographically distributed collection of nodes interconnected by communication links and segments for transporting communications (e.g., data, voice, video) between communication units (end nodes), such as personal computers, certain telephones, personal digital assistants (PDAs), video units and the like. Many types of communication networks are available, with the types ranging from local area networks (LANs) to wide area networks (WANs). LANs typically connect nodes over dedicated private communications links located in the same general geographical location, such as a building or campus. WANs, on the other hand, typically connect large numbers of geographically dispersed nodes over long-distance communications links, such as common carrier telephone lines. The Internet is an example of a WAN that connects networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol is a set of rules defining how the nodes interact with each other.

In some communication networks, such as the Internet, users (subscribers) gain access to a communication network via a service provider (SP). An SP is an entity, such as a business or organization, that offers access to various services provided by the entity, such as access to the communication network. SPs that provide access to the Internet and related services are commonly called Internet SPs (ISPs).

Some SPs, such as ISPs, charge their subscribers a fixed monthly fee for unlimited access to certain services provided by the SP, such as Internet access. The rationale here is that most users will make light usage of the service and thus not place great demands on the SP's network hardware and software resources. However, as certain high-bandwidth applications, such as peer-to-peer (P2P) applications and streaming video, gain popularity among subscribers, SPs are finding that more and more demand is being placed on their networks.

Service providers must find ways to deal with the challenges posed by the aggressive nature of P2P applications. Simply adding additional network capacity to the network may be costly and cumbersome to manage. Moreover, some networks are expensive to maintain and competition for subscribers is often fierce. Thus, some SPs find it difficult to maintain a solid margin and profit from their subscribers. Moreover, because certain subscribers may have unlimited access to the SPs' services, additional capacity added to the network in order to allocate additional bandwidth to these subscribers to accommodate their demands may be quickly consumed leaving strained SPs in the same situation.

One way SPs are addressing these issues is to monitor the usage of their networks to determine if certain applications are causing network congestion or increased expenditures and proactively act to restrain the effect of these applications. Moreover, SPs may seek to identify subscribers that are consuming an unacceptably large amount of network resources and either charge them for the excessive usage or potentially enforce various policies to limit their usage. For example, SPs may wish to provide tiered pricing plans whereby users who consume a great deal of resources are charged a different rate than users who consume fewer resources.

An SP may employ a service control engine (SCE) to control or monitor subscriber access to its network's resources. An SCE is a network device that is configured to, inter alia, monitor network traffic (data packets) transferred between a subscriber and an SP's network and enforce certain policies with regards to the monitored traffic. These policies may include filtering certain traffic e.g., limit usage of the SP's network by the subscribers. Traffic not filtered by the SCE is passed through the device. In a typical configuration, the SCE is positioned in a path taken by the traffic and acts as a "bump in the wire." That is, it behaves in a manner that is "transparent" to the traffic carried on the path.

SCEs typically enforce policies by identifying the nature of network traffic, determining if a policy applies and enforcing the policy if necessary. The nature of the traffic is typically identified using a process known as a "deep packet inspection and analysis." Deep packet inspection and analysis involves inspecting a packet at layers not normally inspected by other network devices (e.g., routers, bridges), such as the application layer which is layer-7 (L7) of the Open Systems Interconnection Reference Model (OSI-RM), and analyzing the inspected layers to identify the nature of the traffic (e.g., an application associated with the traffic). After identifying the nature of the traffic, the SCE can then decide how to act on (handle) the traffic.

For example, an SP may have a policy that limits the number of streaming video connections a particular subscriber may have active at any given time. The SP may employ an SCE to enforce this policy. Packets generated by subscribers are examined by the SCE using deep packet inspection and analysis to determine if they conform to the policy. If so, the SCE allows the packets to be transferred to their destination. If the packets do not conform to the policy, the SCE may filter the packets, respond to them or perform other steps as set forth by the policy. Thus, if a particular subscriber already has the limited number of video streams active and generates a packet to request an additional video stream, the SCE may filter the request and not let it proceed to its destination, respond to the request with an error message or take other action.

In addition to enforcing certain subscriber policies, SCEs may be configured to generally collect statistics of network usage. Thus, an SP may use an SCE to gather statistics regarding the type of applications that are being utilized on the SP's network. The SP may then use these statistics to better understand how subscribers use the SP's network and tailor services for those subscribers accordingly.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Service control engines (SCEs) are limited with regards to the rate at which they can process data packets. This is primarily due to the compute intensive nature of deep packet inspection coupled with the other duties typically performed by the SCE, such as matching packets to data flows, enforcing policies against the packets and keeping various statistics. This may pose a problem in certain service provider (SP) networks that may wish to employ an SCE to monitor and police network traffic on a high-speed high-capacity link. Here, the link may carry packets at a rate that is faster than an SCE can process. Thus, the SCE may not be able to properly process the traffic carried on the link.

The present invention overcomes these shortcomings by incorporating a technique for dispatching packets to a plurality of SCEs which in aggregate may be configured to handle traffic produced by a high-speed high-capacity data link. In accordance with an aspect of the present invention, traffic associated with data flows are forwarded on a high-speed high-capacity link to a dispatcher. The dispatcher is configured to dispatch the traffic among a plurality of SCEs such that traffic associated with the same data flow is dispatched to the same SCE. The SCEs in aggregate contain sufficient capacity to handle processing the traffic carried on the high-speed high-capacity link.

Advantageously, the present invention is an improvement over the prior art in that it enables deep packet inspection of traffic on high-speed high-capacity data links where it may not otherwise be practical or possible.

Figure 1:
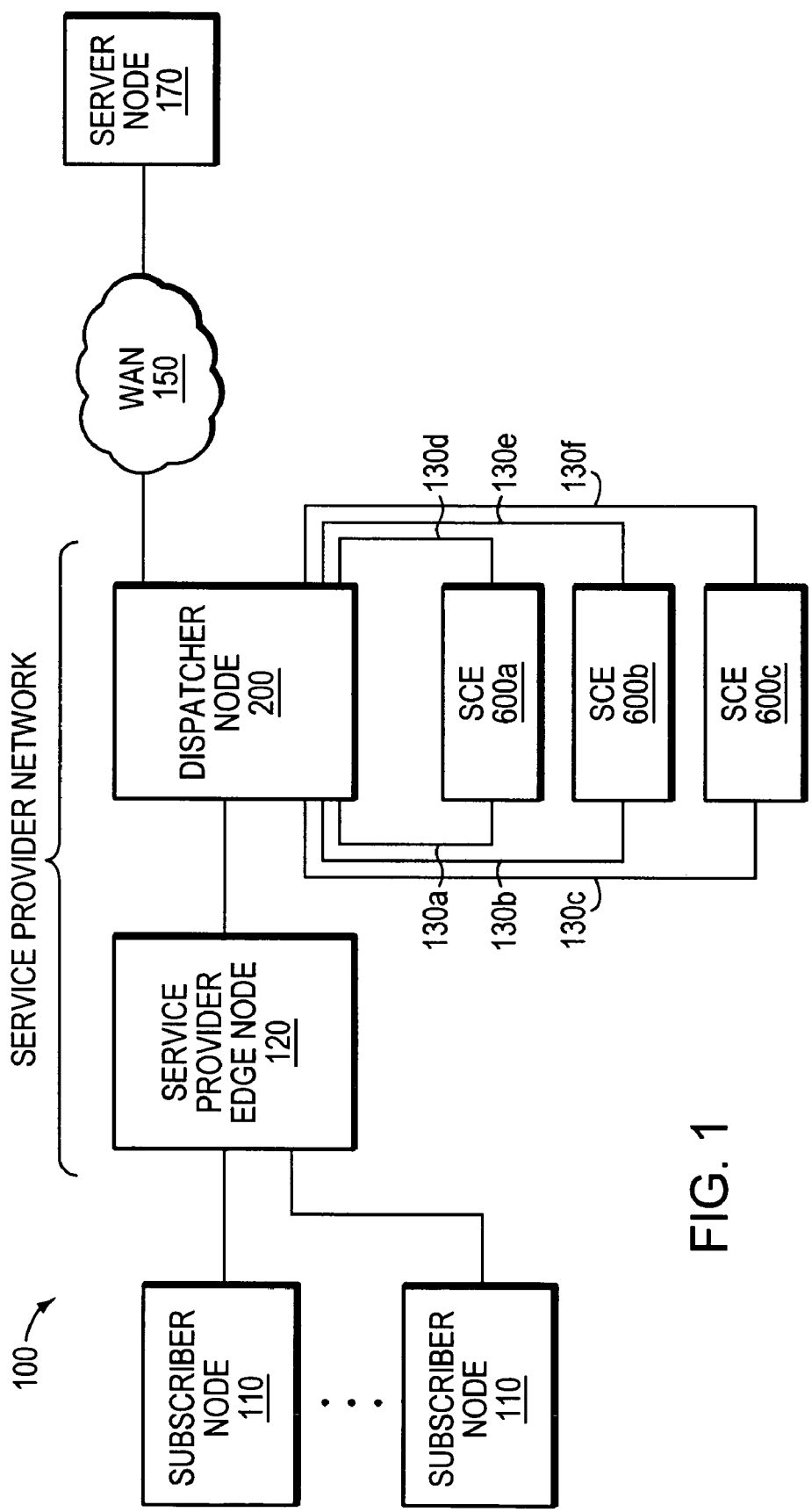
FIG. 1 is a block diagram of an exemplary communication network that may implement the present invention.

FIG. 1 is a block diagram of an exemplary communication network that may be used with the present invention. Network 100 comprises a plurality of nodes including subscriber nodes 110, a service provider edge node 120, dispatcher node 200, server node 170 and SCEs 600a-c coupled via various data links to form an internetwork of nodes. These internetworked nodes communicate by exchanging data packets according to a pre-defined set of protocols, such as the Transmission Control Protocol/Internet Protocol (TCP/IP) over Asynchronous Transfer Mode (ATM) or Ethernet.

The subscriber nodes 110 are conventional nodes, such as personal computers, work stations, personal digital assistants (PDA) and the like. The service provider (SP) edge node 120 is a conventional edge node, such as a router, that is configured to interface the subscriber nodes 110 with the SP's network which includes the SP edge node 120, dispatcher node 200 and the SCEs 600a-c. The server node 170 is a conventional server node that is configured to exchange information (e.g., data packets) with the subscriber nodes 110. The dispatcher node 200 and the server node 170 are coupled via a wide-area network (WAN) 150. The WAN 150 is a conventional WAN, such as the Internet, comprising various nodes (not shown) configured to implement the WAN.

The dispatcher node 200 is illustratively an intermediate node (e.g., a router) that is configured to, inter alia, dispatch packets received from the network 100 to the SCEs 600 on physical links 130. The links 130 couple network interfaces on the dispatcher 200 to the SCEs 600 and enable data to be transferred between the SCEs 600 and the dispatcher 200. Each SCE 600 acts as a "bump on the wire" in the path taken by data traveling from the dispatcher 200 to the SCE 600 and back to the dispatcher 200 meaning that the SCE 600 appears to be "transparent" to data carried on the path.

Figure 2:
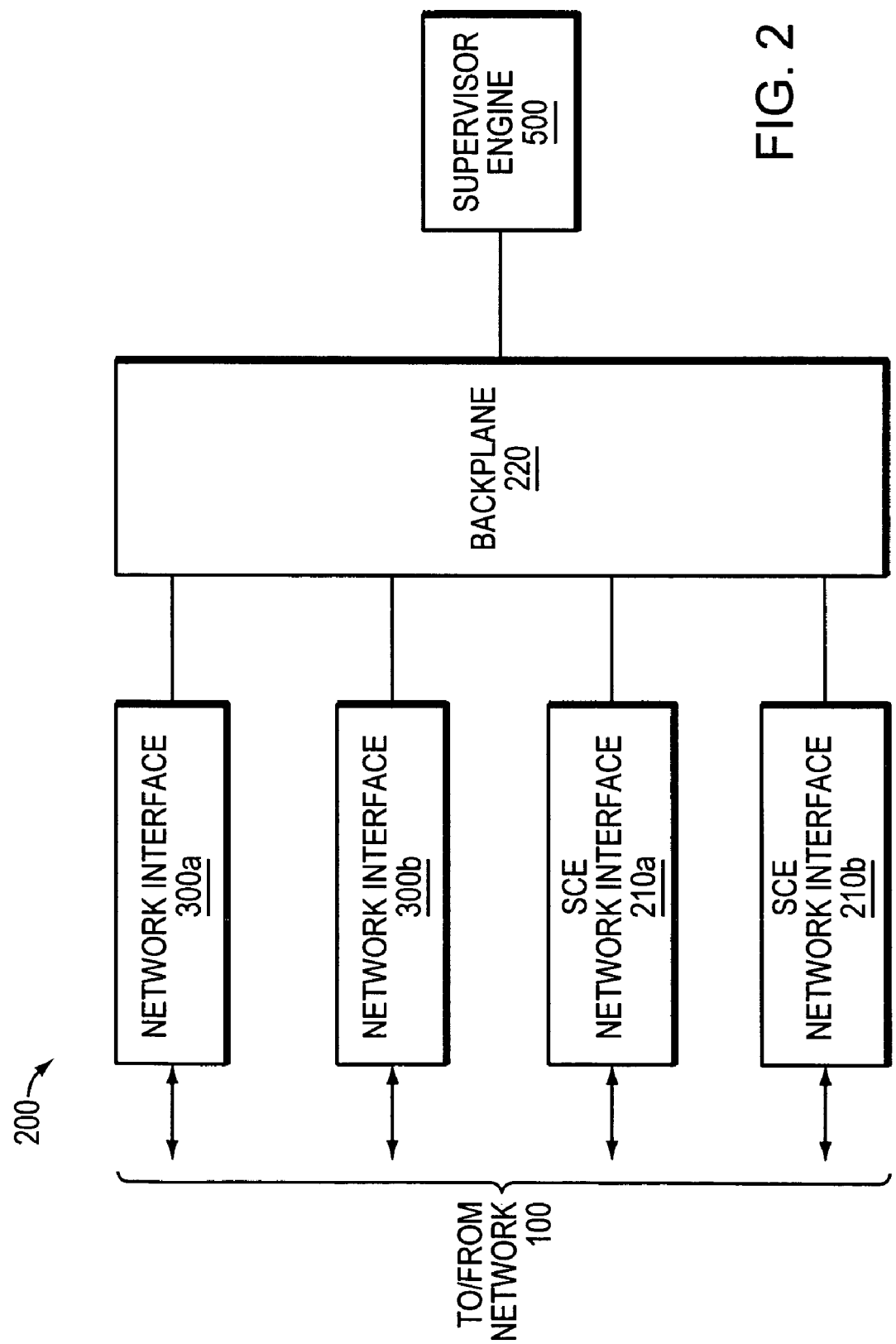
FIG. 2 is a block diagram of a dispatcher node that may be used with the present invention.

FIG. 2 is a high-level block diagram of a dispatcher node 200 that may be used with the present invention. Node 200 comprises one or more network interface cards 300, one or more SCE network interface cards 210 and a supervisor engine card 500 interconnected by a backplane 220. Node 200 is configured to perform various conventional layer-2 (L2) and layer-3 (L3) switching and routing functions. As used herein, L2 and L3 refer to the data link and network layers, respectively, of the Open Systems Interconnection Reference Model (OSI-RM). In addition, as will be described further below, node 200 is configured to dispatch data packets received by the network interfaces 300 to SCEs 600 in accordance with an aspect of the present invention. A suitable network device that may be used with the present invention to implement dispatcher node 200 is the Cisco 7600 series router available from Cisco Systems Incorporated, San Jose, Calif.

The backplane 220 comprises point-to-point interconnections that interconnect the various cards and allow data and signals to be transferred between the cards. The SCE network interfaces 210 are conventional network interfaces that couple the dispatcher 200 with the SCEs 600 and enable data to be transferred between the dispatcher 200 and the SCEs 600. Network interfaces 300 couple the dispatcher 200 with other nodes in the network 100 (e.g., the SP edge node 120 and nodes contained in the WAN 150) and allow data packets to be transferred between the intermediate node 200 and these nodes using various protocols such as ATM, Frame Relay (FR), Ethernet and the like.

Figure 3:
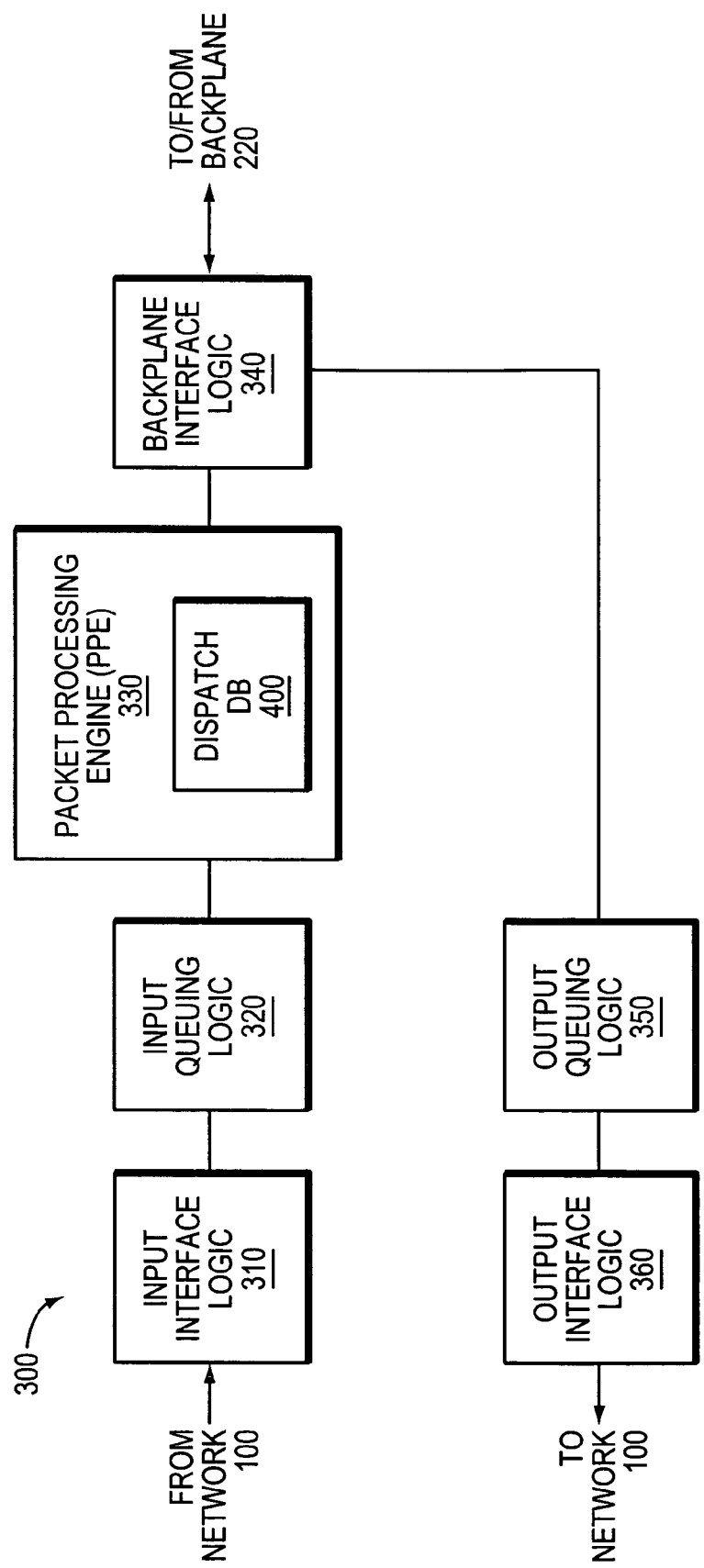
FIG. 3 is a block diagram of a network interface that may be used with the present invention.

FIG. 3 is a high-level partial block diagram of a network interface 300 that may be used with the present invention. Interface 300 comprises input interface logic 310, input queuing logic 320, a packet processing engine (PPE) 330, backplane interface logic 340, output queuing logic 350 and output interface logic 360. The input 310 and output 360 interfaces comprise circuitry configured to enable packets to be transferred between the network interface 300 and the network 100 using various protocols, such as ATM, FR, Ethernet and the like. To that end, the interfaces 310, 360 comprise conventional circuitry that incorporates signal, electrical, and mechanical characteristics and interchange circuits, needed to interface with the physical media of the network 100 and protocols running over that media.

The input 320 and output 350 queuing logic contain conventional packet queues (not shown) configured to buffer and queue packets transferred between the network interface 300 and the network 100. The backplane interface 340 comprises conventional circuitry configured to interface the network interface 300 with the backplane 220 and enable data to be transferred between the network interface 300 and other cards attached to the backplane 200.

The PPE 330 comprises forwarding logic configured to dispatch packets received by the network interface 300 to an SCE 600 in accordance an aspect of the present invention. Illustratively, PPE 330 is implemented as a series of one or more Application Specific Integrated Circuits (ASICs) which contains the forwarding logic portions of which may be configured by the supervisor engine 400. Note that this forwarding logic may contain a processor and memory that is configured to dispatch the packets in accordance with aspects of the present invention.

Operationally, data packets received from the network 100 by a network interface 300 are received at the input interface 310 and transferred to the input queuing logic 320 where the packets are placed on a queue for transfer to the PPE 330. The PPE 330 removes the packets from the queue, determines destinations for the packets and configures the backplane interface 340 to transfer the packets to the destinations which may be one or more cards in dispatcher 200 (e.g., another network interface 300, SCE network interface 210, supervisor engine 500) and/or the output queuing logic 350. Packets destined for another card are transferred to the card via the backplane 220. Packets destined for the output queuing logic 350 are transferred to the output queuing logic 350 which schedules the packets for transfer onto the network 100 and places the packets on a queue contained in the output queuing logic 350. A packet ready for transfer onto the network 100 is removed from its queue by the output queuing logic 350 and transferred to the output interface 360 which transfers the packet onto the network 100.

Packets processed by the PPE 330 are dispatched to SCEs 600 via physical links associated with logical channels called port channels. Each SCE network interface 210 is configured with one or more port channels wherein each port channel is associated with one or more physical links 130. A technology that may be used with the present invention to implement the port channels is the EtherChannel technology available from Cisco Systems Incorporated.

The PPE 330 dispatches a packet to an SCE 600 by using an address contained in the packet (e.g., destination address) to identify a port channel associated with the packet, hashing an address contained in the packet to generate a hash value that is used to select a physical link associated with the port channel and forwarding the packet and hash value to the identified port channel.

Figure 4:
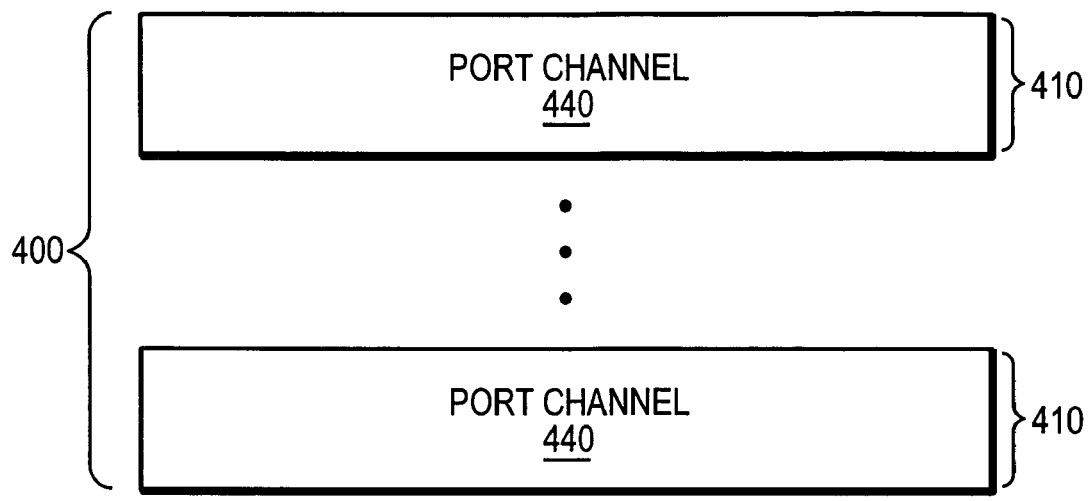
FIG. 4 is a block diagram of a dispatch database that may be used with the present invention.

FIG. 4 is a block diagram of a dispatch database (DB) 400 that may be used with the present invention to identify a port channel for a packet that is to be dispatched to an SCE 600. Dispatch DB 400 is a data structure illustratively configured as a table comprising one or more entries 410 wherein each entry 410 contains a port channel field 440. The port channel field 440 holds a value that represents a port channel that is associated with the packet. A port channel for a particular packet is identified using the DB by hashing an address contained in the packet to generate an index and using the index to select an entry 410 in the DB 400. The contents of the port channel field 440 of the selected entry 410 is then use to identify a port channel associated with the packet. Illustratively, the address contained in the packet that is used to generate the index is a destination address associated with the destination for the packet.

Figure 5:
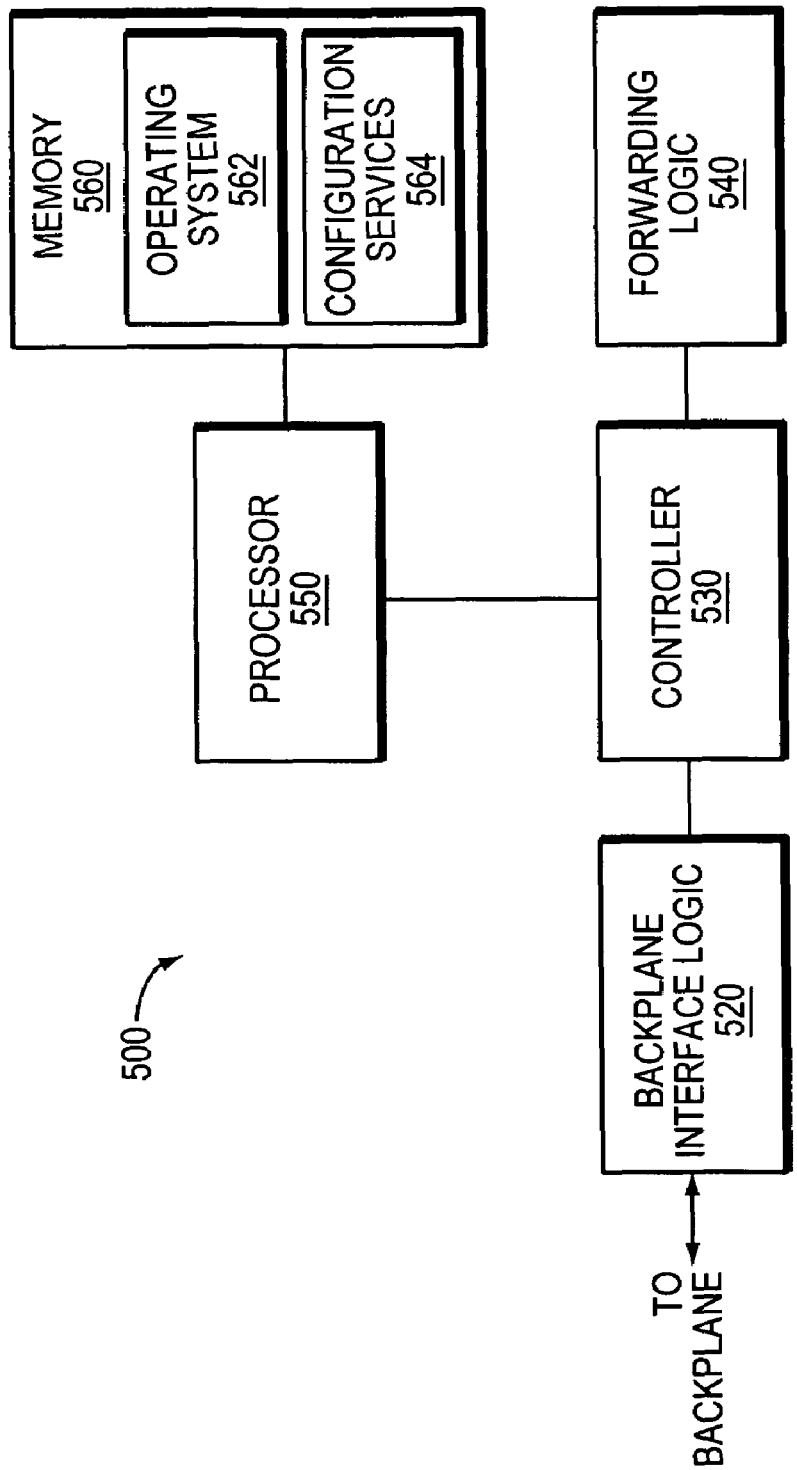
FIG. 5 is a block diagram of a supervisor engine that may be used with the present invention.

FIG. 5 is a high-level partial block diagram of a supervisor engine 500 that may be used with the present invention. The supervisor engine 500 comprises a backplane interface logic 520, a controller 530, a forwarding logic 540, a processor 550 and a memory 560. The backplane interface logic 520 comprises logic configured to buffer and transfer data between the supervisor engine 500 and the backplane 220. The controller 530 comprises logic that is used to steer data between the backplane interface logic 520, the forwarding logic 540 and the processor 550. The forwarding logic 540 comprises one or more ASICs configured to process packets acquired by the supervisor engine 500 including making forwarding decisions for the packets and directing the backplane interface logic to forward the packets to a destination based on the forwarding decisions.

The processor 550 is a conventional central processing unit (CPU) configured to execute computer-executable instructions and manipulate data in the memory 560. The memory 560 is a conventional random-access memory (RAM) comprising e.g., Dynamic RAM (DRAM) devices. The memory 560 includes an operating system 562 and configuration services 564. The operating system 562 is a conventional operating system that comprises computer-executable instructions and data configured to support the execution of processes, such as configuration services 564, on processor 550. Specifically, operating system 562 is configured to perform various conventional operating system functions that, e.g., enable the processes to be scheduled for execution on the processor 550 as well as provide controlled access to various resources, such as memory 560. The configuration services 564 is illustratively a process comprising computer-executable instructions configured to enable processor 550 to (1) generate configuration information that is illustratively used by the processor 550 to configure forwarding logic 540 and the PPEs 330 (including the dispatch DB 400) and (2) configure the forwarding logic 540 and the PPEs 330 with the configuration information. In addition, configuration services 564 may contain code that is configured to maintain the port channels associated with the SCE network interfaces 210.

Figure 6:
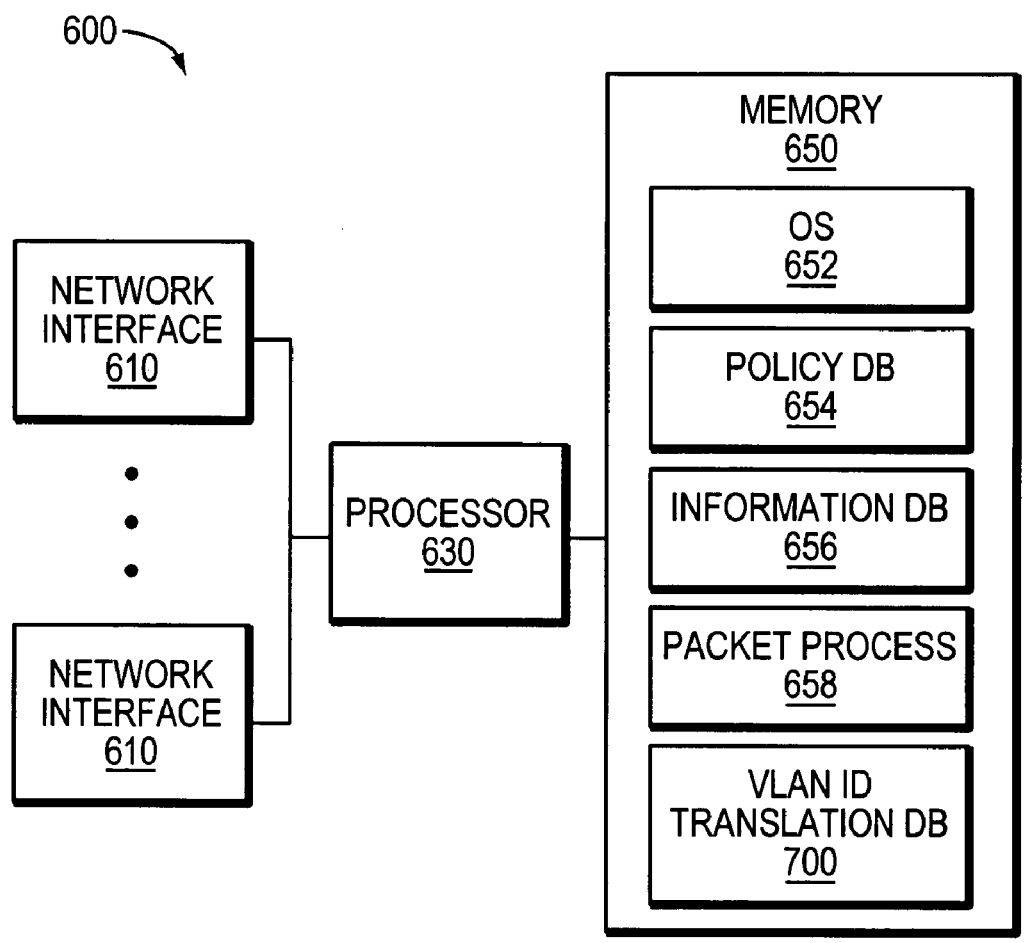
FIG. 6 is a block diagram of a service control engine (SCE) that may be used with the present invention.

FIG. 6 is a high-level block diagram of an exemplary SCE 600 that may be used with the present invention. An example of an SCE that may be used with the present invention is the Cisco SCE 2000 available from Cisco Systems Incorporated. SCE 600 comprises one or more network interfaces 610, a processor 630 and a memory 650. The network interfaces 610 connect (interface) the SCE 600 with the network 100 and enable data packets to be transferred between the SCE 600 and the network 100 using various protocols, such as Ethernet. To that end, the network interfaces 610 comprise conventional interface circuitry that incorporates signal, electrical, and mechanical characteristics and interchange circuits needed to interface with the physical media of the network 100 and protocols running over that media.

The processor 630 is a conventional CPU configured to execute instructions and manipulate data contained in the memory 650. The memory 650 is a conventional RAM comprising e.g., DRAM devices. The memory 650 contains an operating system 652, policy DB 654, an information DB 656, packet process 658 and a Virtual Local Area Network (VLAN) identifier (ID) translation DB 700.

The operating system 652 is a conventional operating system that comprises computer-executable instructions and data configured to support the execution of processes, such as packet process 658, on processor 630. Specifically, operating system 652 is configured to perform various conventional operating system functions that, e.g., enable the processes to be scheduled for execution on the processor 630 as well as provide controlled access to various resources on the SCE 600, such as memory 650. The policy DB 654 is a database comprising policy information that is applied to packets processed by the SCE 600 and the information DB 656 is a database comprising information about the packets. This information may include statistical information that is maintained by the SCE 600 for the processed packets. Packet process 658 is a software process comprising computer-executable instructions and data structures configured to process packets received by the SCE 600 in accordance with an aspect of the present invention.

Figure 7:
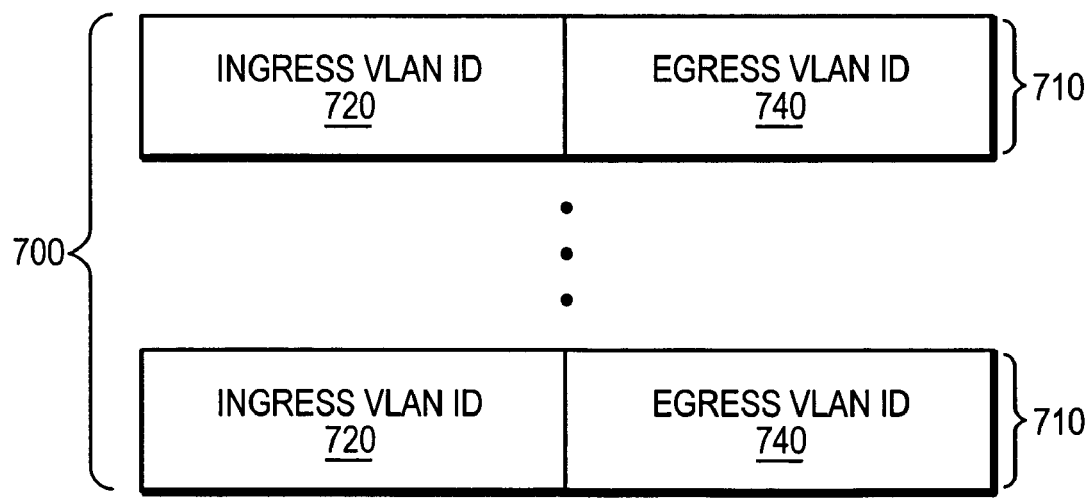
FIG. 7 is a block diagram of a Virtual Local Area Network (VLAN) identifier (ID) translation database that may be used with the present invention.

The VLAN ID translation DB 700 holds information that is used by the SCE 600 to translate a VLANs associated with packets processed by the SCE 600. FIG. 7 is a block diagram of a VLAN ID translation DB 700 that may be used with the present invention. Translation DB 700 is a data structure that is illustratively organized as a table comprising one or more entries 710 wherein each entry contains an ingress VLAN ID field 720 and an egress VLAN ID field 740. The ingress VLAN ID field 720 holds a value that represents a VLAN ID of a VLAN associated with a packet that is received by the SCE 600 from the dispatcher 200. The egress VLAN ID field 740 holds a value that represents a VLAN ID of a VLAN that is associated with the packet before it is transferred from the SCE 600 back to the dispatcher 200. A packet's VLAN is translated by comparing a VLAN ID associated with the packet with the ingress VLAN ID 720 of entries 710 in the database 700 to locate an entry 710 whose VLAN ID 720 matches the VLAN ID in the packet. The VLAN ID associated with the packet is then replaced with the VLAN ID contained in the egress VLAN ID 740 field of the matching entry 710.

As will be described further below, packets are transferred from the dispatcher 200 via a physical link 130 to the SCE 600 where they are received at the network interfaces 610. Each packet is associated with a particular VLAN. The processor 630 processes the packets which may include maintaining various statistics associated with the packets in information DB 656 as well as applying various policies maintained in policy DB 654 to the packets to determine if e.g., the packets are forwarded or dropped. For packets that are forwarded, the processor 630 translates a VLAN ID associated with the packets to "switch" the packets from one VLAN to another, as described above.

It should be noted that functions performed by dispatcher node 200 and the SCEs 600, including functions that implement aspects of the present invention, may be implemented in whole or in part using some combination of hardware and/or software. It should be further noted that computer-executable instructions and/or computer data that implement aspects of the present invention may be stored in various computer-readable mediums, such as volatile memories, non-volatile memories, flash memories, removable disks, non-removable disks and so on. In addition, it should be noted that various electromagnetic signals, such as wireless signals, electrical signals carried over a wire, optical signals carried over optical fiber and the like, may be encoded to carry computer-executable instructions and/or computer data that implement aspects of the present invention on e.g., a communication network.

In network 100, packets are transferred between the subscriber nodes 110 and the server node 170 via bi-directional data flows. For a particular data flow, packets traveling from a subscriber node 110 to the server node 170 travel in an upstream direction and are considered upstream packets. Likewise, packets traveling from the server node 170 to the subscriber node 110 travel in a downstream direction and are considered downstream packets.

At the dispatcher 200, the PPEs 330 and the supervisor engine's forwarding logic 540 are configured such that packets for a particular data flow that are received in either direction are dispatched to the same SCE 600. Dispatching packets associated with a particular data flow to the same SCE 600 acts to reduce complexity with regards to maintaining state for the data flow.

Figure 8A:
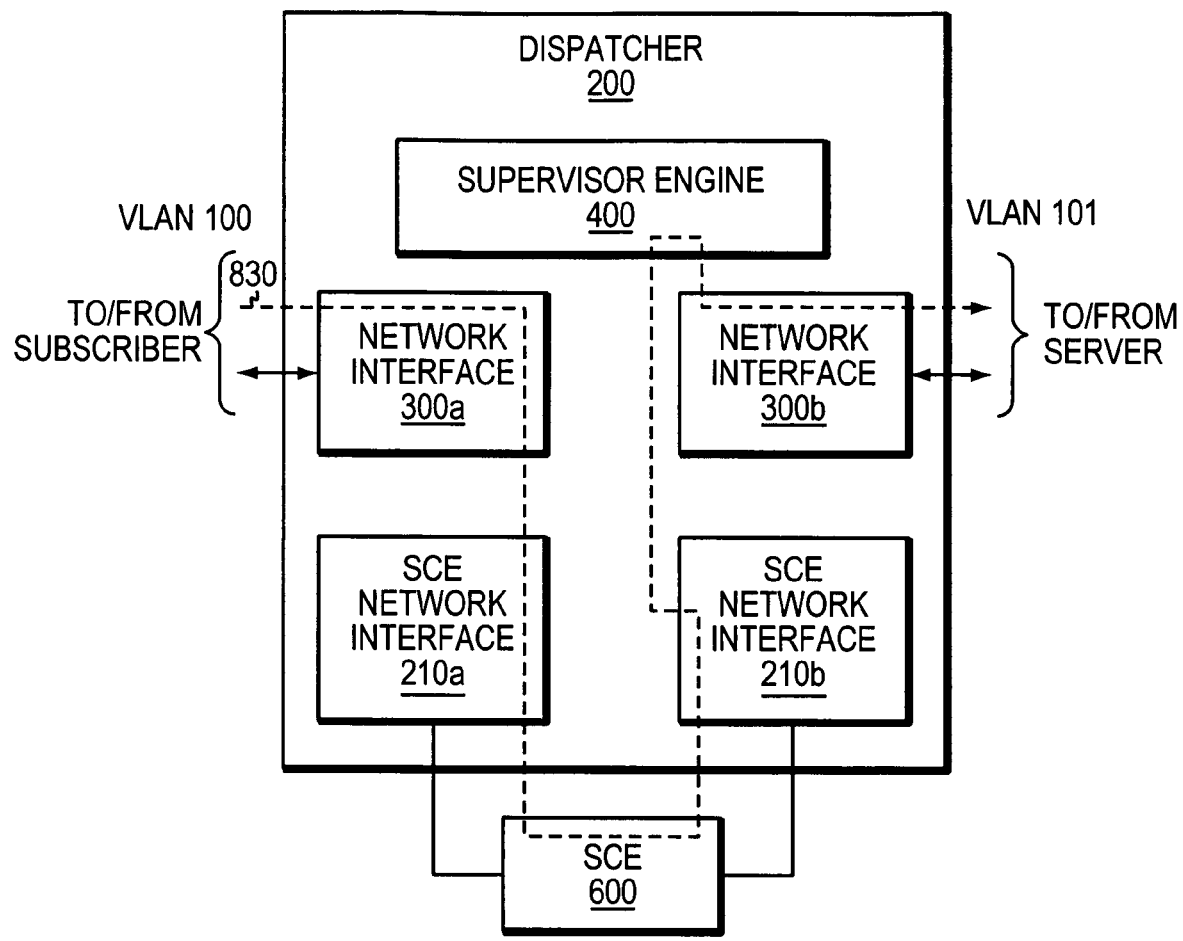
FIGS. 8A-B illustrate the processing of upstream and downstream packets, respectively, in a dispatcher in accordance with an aspect of the present invention.
Figure 8B:
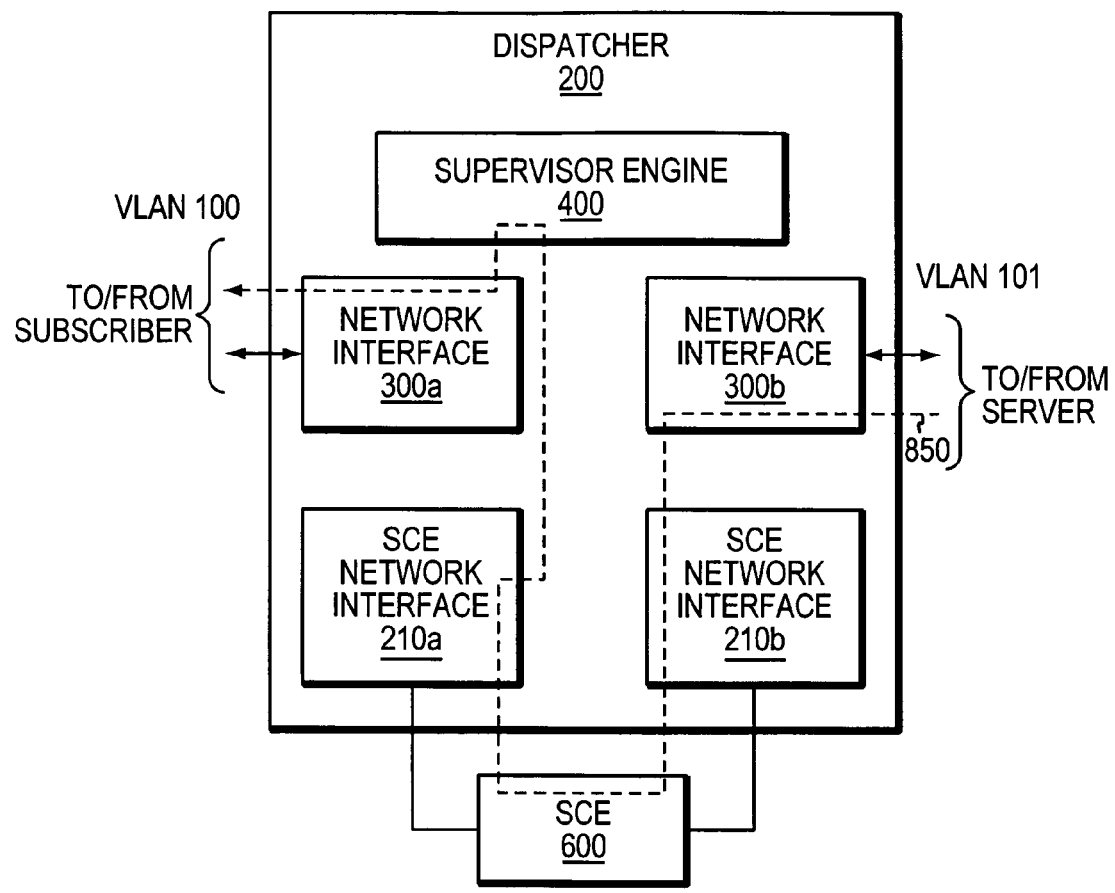

FIGS. 8A-B illustrate the dispatching and processing of upstream and downstream data packets, respectively, at dispatcher 200 in accordance with an aspect of the present invention. Referring to FIG. 8A, path 830 illustrates the path taken by upstream packets traveling through the dispatcher 200 in the upstream direction from a subscriber 110 to the server 170. Specifically, an upstream packet is received at network interface 300a on a VLAN used to communicate with the subscriber 110 (i.e., VLAN 100). Network interface 300a processes the packet including identifying a port channel on the SCE network interface 210a that is to receive the packet. Network interface 300a then hashes an address contained in the packet to select a physical link 130 associated with the identified port channel and transfers the packet, identified port channel and hash value to SCE network interface 210a. Illustratively, the address contained in the packet used to generate the hash value is a source address of the packet.

Note that, as will be described further below, the hash value is used to select a physical data link 130 that is used to carry the packet to an SCE 600. By virtue of selecting a physical data link 130, the hash value selects an SCE 600 that is to receive and process the packet. Thus, the address that was used to derive the hash value acts to identify the SCE 600 that is to receive and process the packet.

Interface 210a receives the packet, identified port channel and hash value, uses the identified port channel and the hash value to identify a physical data link 130 associated with the port channel and transfers the packet on the identified physical link 130 to an SCE 600. The SCE 600 receives the packet and processes it including switching the packet from the subscriber's VLAN to the server's VLAN, as described above. The SCE 600 then transfers the packet back to the dispatcher 200 via a physical link 130 where it is received at SCE network interface 210b. The SCE network interface 210b processes the packet and forwards it to the supervisor engine 400. The supervisor engine 400 determines that the server 170 can be reached through network interface 300b and forwards the packet to interface 300b. Network interface 300b receives the packet from the supervisor engine 400 and forwards it via the network to the server 170 on the server's VLAN (i.e., VLAN 101).

Referring now to FIG. 8B, path 850 illustrates the path taken by downstream packets traveling from the server 170 to a subscriber 110. Specifically, a downstream packet issued by the server 170 and destined for a subscriber 110 is received on the server's VLAN (e.g., VLAN 101) by the dispatcher 200 at network interface 300b. Network interface 300b processes the packet including identifying a port channel and hashing an address contained in the packet to generate a hash value that is used to identify a physical link associated with the identified port channel. Illustratively, the address used to generate the hash value is a destination address contained in the packet. The network interface 300b then dispatches the packet to the identified port channel on interface 210b by forwarding the packet, the identified port channel and the identified physical link to network interface 210b. Interface 210b receives the packet, identified port channel and physical link information, uses the port channel and physical link information to identify a physical link 130 that couples the SCE network interface 210b with an SCE 600 and transfers the packet on the identified physical link 130. The SCE 600 receives the packet and processes it including switching the packet from the server's VLAN to the subscriber's VLAN. The SCE 600 then transfers the packet back on a physical link 130 to the dispatcher 200 where it is received at SCE network interface 210a. SCE network interface 210a processes the packet and forwards it to the supervisor engine 400. The supervisor engine 400 determines that the subscriber 110 can be reached through network interface 300a and forwards the packet to interface 300a. Network interface 300a receives the packet from the supervisor engine 400 and forwards it via the network to the subscriber 110 on the subscriber's VLAN (e.g., VLAN 100).

Illustratively, packets processed by dispatcher 200 are IP packets that contain an IP header that conforms to the well-known IP protocol. A version of the IP protocol that may be used with the present invention is described in Request For Comments (RFC) 791 which is available from the Internet Engineering Task Force (IETF) and which is hereby incorporated by reference in its entirety as though fully set forth herein. It should be noted, however, that the inventive technique may be adapted to process packets that contain header information which conforms to other protocols.

Figures 9, 10:
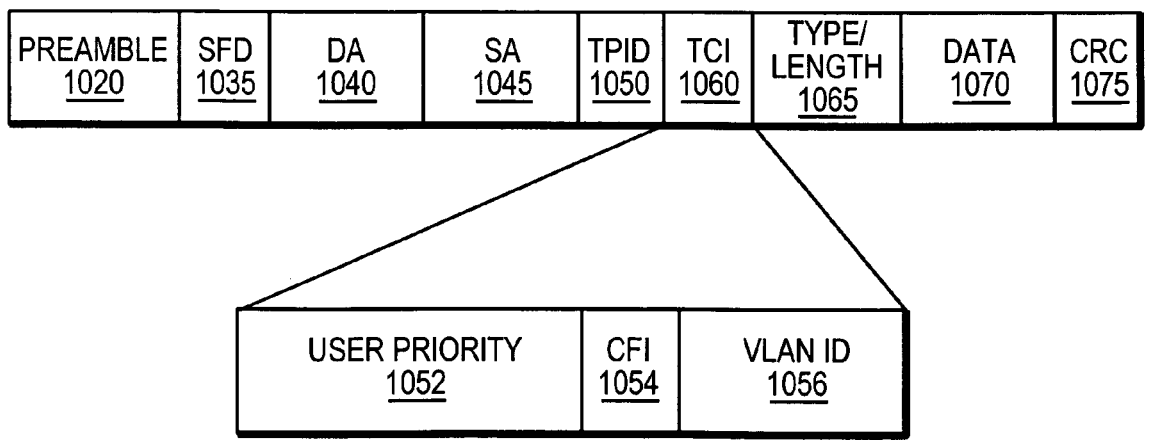
FIG. 9 is an Internet Protocol (IP) packet header that may be used with the present invention.
FIG. 10 is a block diagram of an Institute of Electrical and Electronic Engineers (IEEE) 802.1Q frame that may be used with the present invention.

FIG. 9 is a block diagram of an IP header 900 that may be used with the present invention. IP header 900 comprises a version field 920, an Internet header length (IHL) field 925, a type of service (TOS) field 930, a total length field 935, an identification field 940, a flags field 945, a fragment offset field 950, a time-to-live (TTL) field 955, a protocol field 960, a header checksum field 965, a source IP address field 970, a destination IP address field 975 and an options and padding field 980.

The version field 920 specifies a value that represents a format of the IP packet header. Illustratively, this value is set to a value of 4 to indicate that the packet header is an IP version 4 (IPv4) type packet or to a value of 6 to indicate that the packet header is an IP version 6 (IPv6) type packet. The IHL field 925 holds a value that represents a length of the IP packet header 900. The TOS field 930 holds a value that specifies various parameters associated with a type of service requested for the packet. The total length field 935 holds a value that represents the total length of the header plus a payload (not shown). The identification field 940 holds a value that is used to identify fragments of an IP packet associated with the header 900. The flags field 945 holds a value that represents various flags associated with the packet containing the header 900. The fragment offset field 950 holds a value that represents an offset value associated with a fragment of the packet associated with the header 900. The TTL field 950 holds a value that represents a timer used to track the lifetime of the packet. The protocol field 960 holds a value that represents a protocol related to the packet. The header checksum field 965 holds a value that represents a checksum of the IP header 900. The source IP address field 970 holds a value that represents a source IP address associated with the packet. The destination IP address field 975 holds a value that represents a destination address associated with the packet. The options and padding field 980 holds a value that represents various options associated with the packet. The padding field is used as a filler to guarantee that the payload which follows the header 900 starts on a 32-bit boundary.

As noted above, packets traveling between the dispatcher and the SCEs 600 travel on physical links 130 associated with port channels. Illustratively, the packets are transferred on Institute of Electrical and Electronic Engineers (IEEE) 802.1Q trunks that are carried by the physical links 130. IEEE 802.1Q trunks are described in "802.1Q IEEE Standards for Local and metropolitan area networks Virtual Bridged Local Area Networks," IEEE Std. 802.1Q, 2003 Edition, pp. 1-312, which is available from the IEEE and which is hereby incorporated by reference in its entirety as though fully set forth herein.

Packets traveling on the trunks are encapsulated in 802.1Q frames. FIG. 10 is a block diagram of an 802.1Q frame 1000 that may be used with the present invention. Frame 1000 comprises a preamble field 1020, a start frame delimiter (SFD) field 1035, a destination address (DA) field 1040, a source address (SA) field 1045, a tag protocol identifier (TPID) field 1050, a tag control information (TCI) field 1060, a type/length field 1065, a data field 1070 and a cyclic redundancy check (CRC) field 1075.

The preamble field 1020 holds a value that represents a preamble that may be used to synchronize a receiver to receive the frame 1000. The SFD field 1035 holds a value that indicates a start of the frame 1000. The DA field 1040 holds a value that represents an address of a destination for the frame 1000. The SA field 1045 holds a value that represents an address of the station that sourced the frame 1000. The TPID field 1050 holds a value that identifies the frame as an IEEE 802.1Q frame. The type/length field 1065 holds a value that represents a length of the frame 1000. The data field 1070 holds payload data carried by the frame 1000. Illustratively, this payload data contains the packet carried by the frame 1000. The CRC field 1075 holds a value that represents a cyclic redundancy check of the frame 1000.

The TCI field 1060 holds VLAN tag information associated with the frame 1000. Specifically, this field holds a user priority value 1052, a canonical format indicator (CFI) 1054 and a VLAN ID 1056. The user priority field 1052 holds a value that represents a priority level associated with the frame 1000 that may be used to prioritize handling of the frame 1000. The CFI field 1054 holds a value that is used for compatibility purposes between Ethernet and token ring type networks. This value is typically set to zero. The VLAN ID field 1056 holds an identifier that identifies a VLAN associated with the packet contained in the data field 1070.

Figure 11:
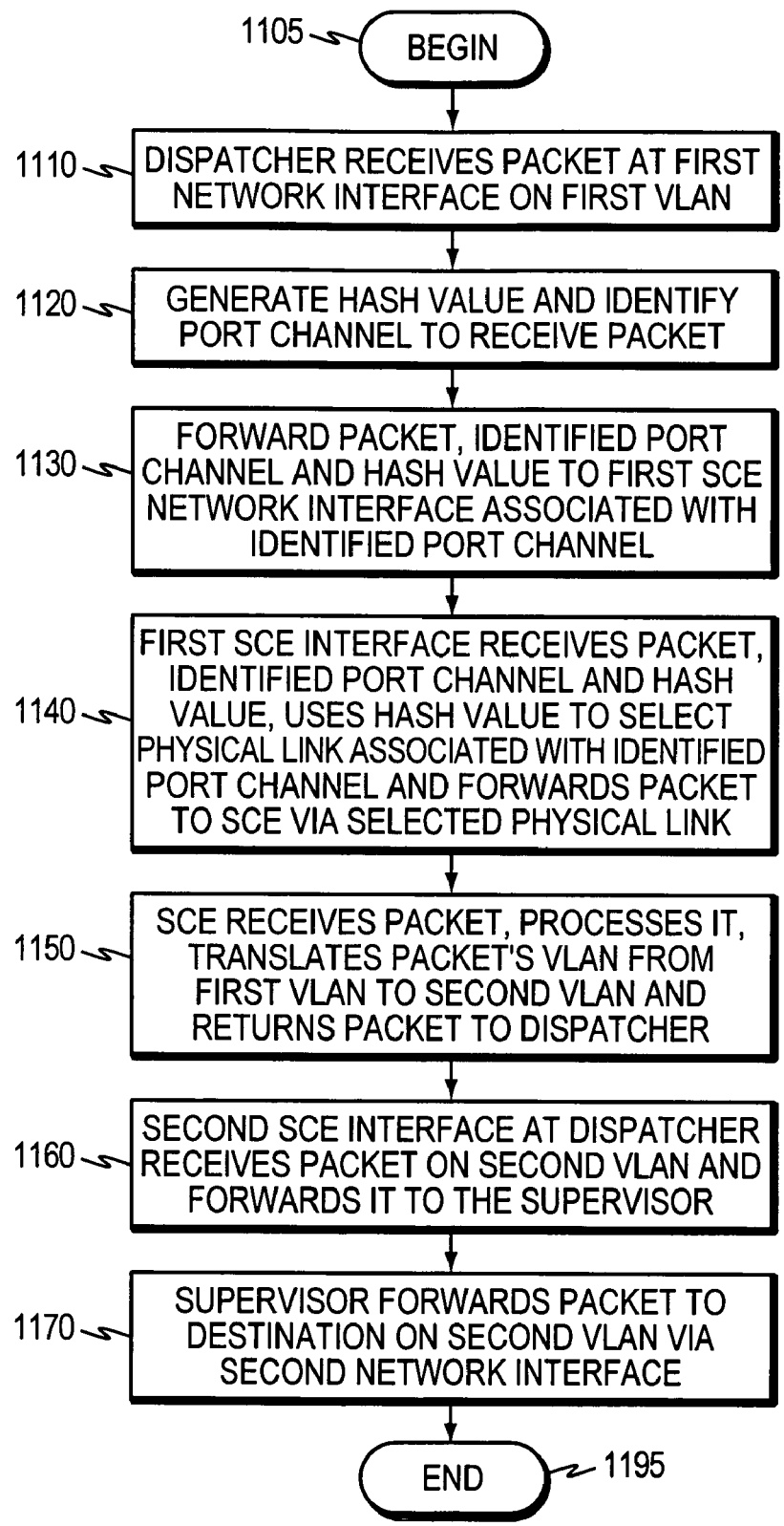
FIG. 11 is a flowchart of a sequence of steps that may be used to dispatch packets to an SCE in accordance with an aspect of the present invention.

FIG. 11 is a flowchart of a sequence of steps that may be used to configure dispatcher 200 to identify an SCE 600 that is to receive a packet received by the dispatcher 200 and dispatch the packet to the SCE 600, to perform deep packet inspection on the packet, in accordance with an aspect of the present invention. The sequence begins at step 1105 and proceeds to step 1110 where the dispatcher 200 receives the packet from the network 100 on a first VLAN at a first network interface 300. Next, at step 1120, the first network interface 300 processes the packet including generating a hash value and identifying a port channel on a first SCE network interface 210, as described above. As will be described further below, the combination of port channel and the generated hash value is illustratively used to select a physical link 130 on which to transfer the packet to an SCE 600. Thus, this combination illustratively acts to identify an SCE 600 that is to receive the packet. The sequence then proceeds to step 1130 where the packet, the port channel and the hash value are forwarded to the first SCE network interface 210.

Next, at step 1140, the first SCE network interface 210 receives the packet, port channel and hash value and uses the port channel and hash value to select a first physical data link 130 on which to transfer the packet to an SCE 600. The packet is then forwarded on the selected physical data link 130 to the SCE 600. Note that steps 1120-1140 illustratively act to dispatch the packet to the SCE 600. At step 1150, the SCE 600 receives the packet, processes it, translates the packet's VLAN from a first VLAN to a second VLAN, as described above, and returns the packet on a physical link 130 to the dispatcher 200.

The second SCE interface 210, at step 1160, receives the packet on the second VLAN and forwards the packet to the supervisor engine 400. At step 1170, the supervisor engine 400 identifies a second network interface 300 through which the destination for the packet may be reached and forwards the packet to the identified network interface 300. The network interface 300 receives the packet and forwards it on the second VLAN to the destination. The sequence ends at step 1195.

As noted above, packets transferred to an SCE 600 from the dispatcher 200 are illustratively encapsulated in frames 1000 by the dispatcher 200 and transferred to the SCE 600 via trunks carried by the physical links 130. The packets are placed in the payload 1070 portion of the frames 1000. A VLAN ID of a VLAN that is associated with the packet is placed in the VLAN ID field 1056 of the frame. The SCE 600 receives the frames 1000 and processes them including translating the VLAN IDs 1056 contained in the frames 1000 to switch the packets contained in the frames 900 from a first VLAN to a second VLAN, as described above. The packets are then returned to the dispatcher 200 and received on the second VLAN.

Figure 12:
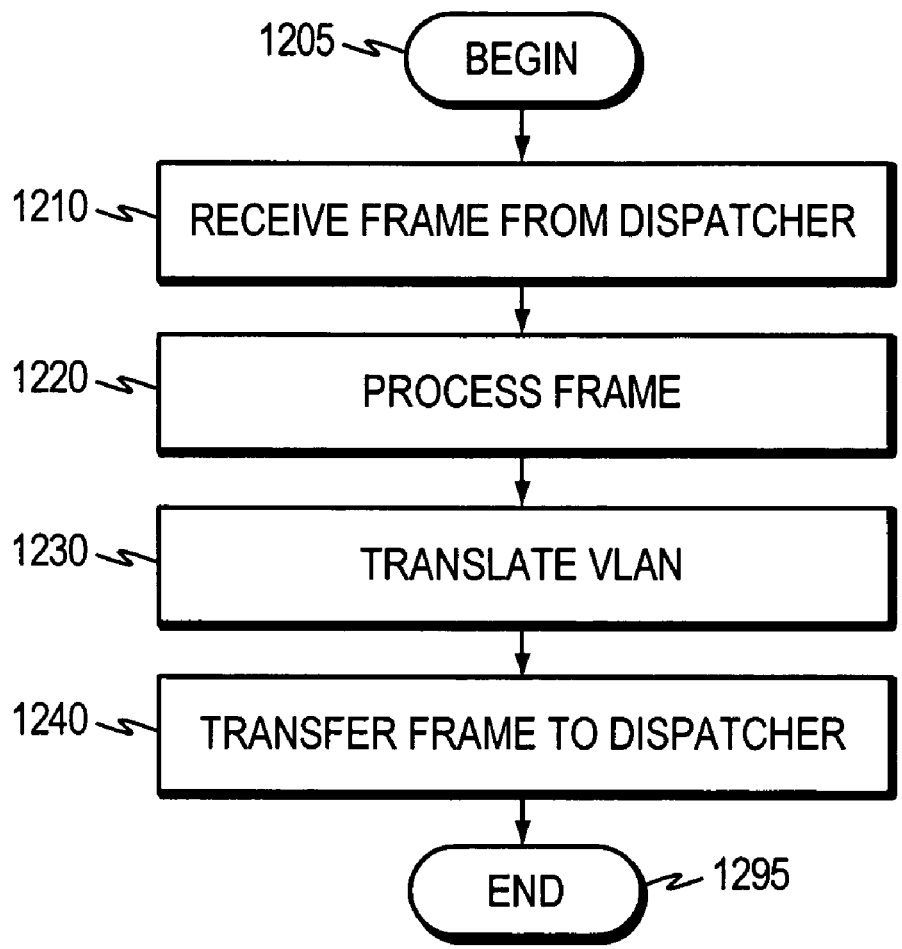
FIG. 12 is a flowchart of a sequence of steps that may be used to process a packet at an SCE in accordance with an aspect of the present invention.

FIG. 12 is a flow chart of a sequence of steps that may be used to process a frame 1000 at an SCE 600 in accordance with an aspect of the present invention. The sequence begins at step 1205 and proceeds to step 1210 where the frame 1000 is received from the dispatcher 200. Next, at step 1220, the SCE 600 processes the received frame 1000. This processing may include performing deep packet inspection of the packet contained in the frame's payload to update various statistics maintained in information DB 656 and enforce various policies contained in the policy DB 654 against the packet contained in the frame 1000, as described above. At step 1230, the VLAN associated with the packet is translated from a first VLAN ID to a second VLAN ID, as described above. At step 1240, the SCE 600 transfers the frame 1000 back to the dispatcher 200. The sequence ends at step 1295.

Figure 13:
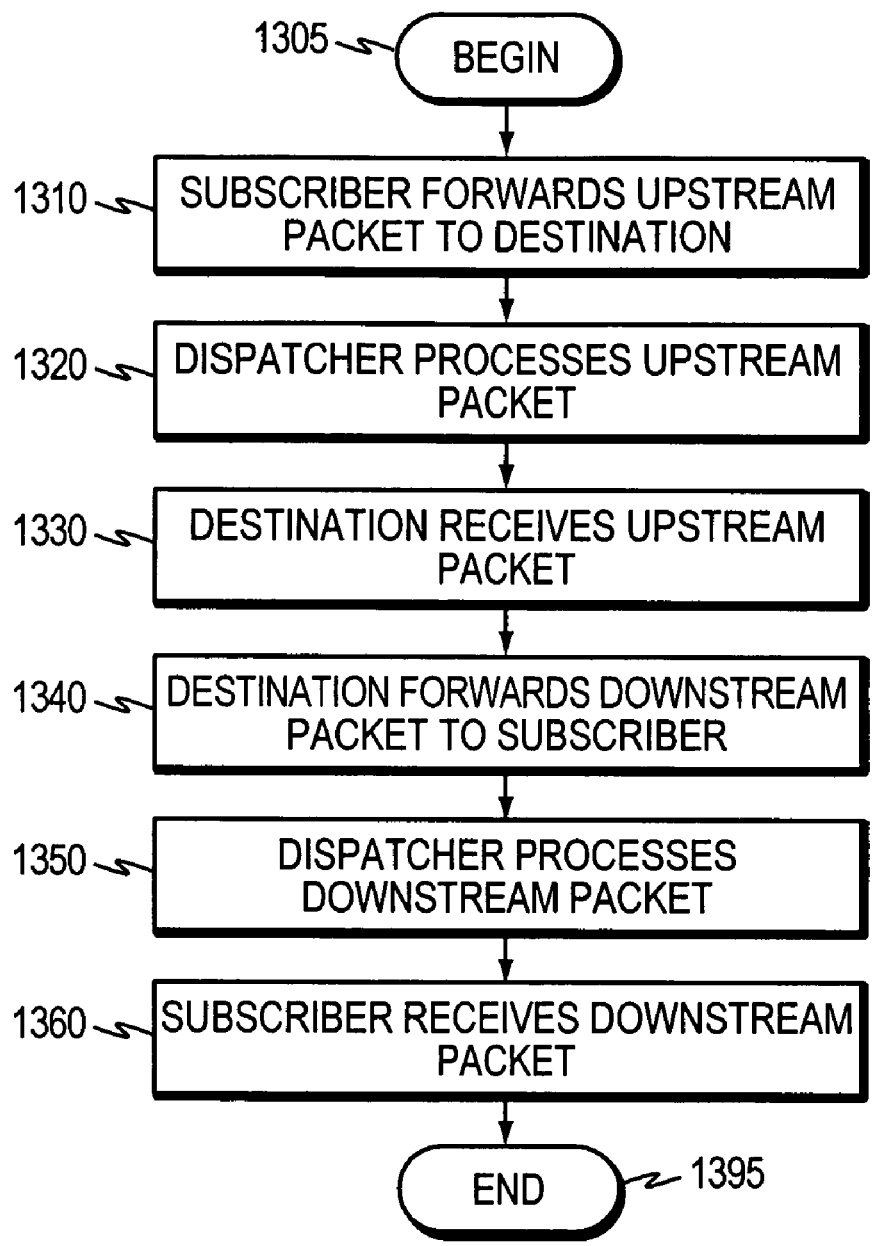
FIG. 13 is a flowchart of a sequence of steps that may be used to transfer upstream and downstream packets between a subscriber and a destination in accordance with an aspect of the present invention.

FIG. 13 is a flowchart of a sequence of steps that may be used to process an upstream packet and a downstream packet of a data flow in accordance with an aspect of the present invention. The sequence begins at step 1305 and proceeds to step 1310 where a subscriber 110 generates and forwards an upstream packet to a destination (e.g., server 170). Next, at step 1320, the dispatcher 200 receives the packet and processes it including dispatching the packet to an SCE 600, receiving the packet from the SCE 600 and forwarding the received packet to the destination, as described above. At step 1330, the destination receives the upstream packet. The destination then, at step 1340, generates a downstream packet and forwards the generated downstream packet to the subscriber 110. The packet travels downstream where it is eventually received by the dispatcher 200 which, at step 1350, processes the downstream packet including transferring it to the same SCE 600, receiving the packet from the SCE 600 and forwarding the received packet to the subscriber 110, as described above. At step 1360, the subscriber 110 receives the downstream packet. The sequence ends at step 1395.

For example, referring to FIGS. 1 and 11-13, assume that packets transferred between the dispatcher 200 and the subscriber node 110 are transferred on VLAN 100 and packets transferred between the dispatcher 200 and the server 170 are transferred on VLAN 101. Further, assume that the forwarding logic 540 and the PPEs 330 have been configured by the supervisor engine 500 to forward packets associated with the same data flow to the same SCE 600.

Now suppose the subscriber node 110 generates an IP packet containing an IP header 900 (FIG. 9) that is destined for server node 170. The subscriber node 110 forwards the packet upstream to the server 170 (step 1310). Specifically, the subscriber node 110 forwards the packet onto the network 100 where it is received by the service provider edge node 120. The service provider edge node 120 forwards the packet to the dispatcher node 200 where it is received by the dispatcher 200 at network interface 300a (step 1110).

At network interface 300a, the packet is received by the network interface's input interface logic 310 (FIG. 3) and transferred to a queue contained in the input queuing logic 320. The packet is then dispatched to an SCE 600 based on an address in the packet (steps 1120-1140). Specifically, the PPE 330 removes the packet from the queue, uses a destination address 975 contained in the packet along with the dispatch DB 400 to identify a port channel on SCE interface 200a that is to receive the packet, as described above. The PPE 330 then generates a hash value by hashing a source address 970 contained in the packet to identify a physical link 130 within the identified port channel that is to carry the packet (step 1120). Illustratively, the hash value is a number from 0-7 and the hash algorithm used to hash the source address 970 to produce the hash value is defined to optimally distribute traffic across the links 130 associated (bundled) with the identified port channel. The PPE 330 then forwards the packet, identified port channel and generated hash value to network interface 210a. Specifically, the PPE 330 directs the backplane interface logic 340 to transfer the packet, the identified port channel and the hash value via the backplane 220 to network interface 210a (step 1130).

Network interface 210a receives the packet, the identified port channel and hash value, uses the hash value to select a physical link 130 associated with the identified port channel and transfers the packet to an SCE 600 via the selected physical link 130 (step 1140). Specifically, the network interface 210a receives the packet, identified port channel and hash value from the backplane 220. The network interface 210a then uses the identified port channel and the hash value to identify a physical link 130 associated with the identified port channel that is to carry the packet. Assume the identified physical link is physical link 130a. The network interface 210a then encapsulates the packet in a frame 1000 and forwards the frame 1000 on a trunk carried by physical link 130a.

The packet travels on the trunk via link 130a to SCE 600a. SCE 600a receives the frame 900, processes it, translates the packet's VLAN and returns the frame 900 to the dispatcher 200 (step 1150). Specifically, SCE 600a receives the frame 1000 at a network interface 610 and transfers the frame 1000 to the processor 630 (step 1210). The processor 630 processes the packet contained in the payload portion of the frame 1000 including performing deep packet inspection of the packet to e.g., maintain various statistics and apply various policies to the packet to determine if the frame 1000 should be forwarded or dropped and so on. In addition, the processor 630 translates the VLAN associated with the packet from VLAN 100 to VLAN 101, as described above. The processor then forwards the frame 1000 out a network interface 610 coupled to physical link 130d to the dispatcher 200.

The upstream packet is received by the dispatcher 200 at SCE interface 210b which forwards the packet to the supervisor engine 400 (step 1160). Specifically, the frame 1000 travels on link 130d back to the dispatcher where it is received on VLAN 101 at SCE interface 210b. SCE 210b removes the packet from the payload portion of the frame 1000 and forwards the packet and the VLAN ID of the VLAN on which the packet was received (i.e., VLAN 101) to the supervisor engine 400 via the backplane 220.

The supervisor engine 400 receives the packet and forwards the packet to its destination via network interface 300b (step 1170). Specifically, the backplane interface logic 520 receives the packet and its VLAN ID. The forwarding logic 540 examines the destination address 975 contained in the packet and determines that the destination (i.e., the server 170) can be reached via network interface 300b. The supervisor engine 400 then forwards the packet and its VLAN ID to network interface 300b via the backplane 220. Network interface 300b receives the packet and its VLAN ID and forwards the packet to the server 170 on VLAN 101.

Now assume that the server 170 generates a downstream IP packet containing a header 900 and forwards the packet the subscriber 110 (step 1340). Specifically, the packet is forwarded downstream from the server 170 through the WAN 150 to the dispatcher 200 which receives the downstream packet at network interface 300b (step 1110), as described above.

The network interface 300b identifies a port channel to receive the packet and generates a hash value that is used to select a physical link 130 associated with the identified port channel (step 1120). Specifically, the PPE 330 at network interface 300b uses a destination address 975 contained in the packet to identify a port channel on SCE network interface 210b that is to receive the packet. The PPE 330 then hashes the destination address 975 to generate a hash value, as described above.

The network interface then forwards the packet, the identified port channel and hash value to SCE network interface 210b, as described above (step 1130). Network interface 210b receives the packet, port channel and hash value, uses the hash value and port channel to identify a physical link 130 that is to be used to transfer the packet to an SCE 600. Assume the identified physical link is 130d. The network interface 210b then encapsulates the packet in a frame 1000 forwards the frame 1000 to SCE 600a via physical link 130d, as described above.

SCE 600a receives the frame 1000, processes the packet contained in the frame 1000 including translating the packet's VLAN (from VLAN 101 to VLAN 100) and forwards the frame 1000 on link 130a back to the dispatcher 200, as described above (step 1150). The frame 1000 is received at SCE network interface 210a which removes the packet from the frame 1000 and forwards the packet and its VLAN ID (i.e., VLAN 100) to the supervisor engine 400, as described above (step 1160). The supervisor engine 400 processes the packet including determining that the subscriber 110 may be reached through network interface 300a and forwards the packet and its VLAN ID to network interface 300a. Network interface 300a then forwards the packet to the subscriber 110 on VLAN 100.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for dispatching data packets to a service control engine (SCE) in a plurality of SCEs in a communication network, the method comprising:
   in an upstream direction of a data flow:
      receiving a data packet from the communication network;
      hashing a source address contained in the data packet to identify an SCE in the plurality of SCEs;
      dispatching the data packet to the correspondingly identified SCE on a first Virtual Local Area Network (VLAN) to perform deep packet inspection of the data packet;
      receiving the data packet from the correspondingly identified SCE on a second VLAN; and
      forwarding the data packet received from the correspondingly identified SCE to a destination wherein the destination is associated with a destination address contained in the data packet;
   in a downstream direction of the data flow:
      receiving a second data packet from the communication network;
      hashing a destination address contained in the second data packet to identify the SCE in the plurality of SCEs;
      dispatching the second data packet to the correspondingly identified SCE on the second VLAN to perform deep packet inspection of the second data packet;
      receiving the second data packet from the correspondingly identified SCE on the first VLAN; and
      forwarding the second data packet received from the correspondingly identified SCE to a destination associated with the destination address contained in the second data packet;
   such that packets associated with the same data flow are dispatched to the same SCE.

2. A method as defined in claim 1 wherein:
   identifying includes identifying a physical data link from the hashed source address, and
   dispatching includes dispatching the data packet to the correspondingly identified SCE via the identified physical data link.

3. A method as defined in claim 2 wherein:
   dispatching further includes transferring the data packet to the correspondingly identified SCE on a trunk carried by the physical data link.

4. A method as defined in claim 3 wherein the trunk is an Institute of Electrical and Electronics Engineers (IEEE) 802.1Q trunk.

5. A method as defined in claim 1 wherein:
   identifying includes identifying a physical data link from the hashed destination address, and
   dispatching the second data packet to the correspondingly identified SCE includes dispatching the second data packet to the correspondingly identified SCE via the identified physical data link.

6. A method as defined in claim 5 wherein dispatching the second packet to the correspondingly identified SCE further includes transferring the second data packet to the correspondingly identified SCE on a trunk carried by the physical data link.

7. A method as defined in claim 6 wherein the trunk is an Institute of Electrical and Electronics Engineers (IEEE) 802.1Q trunk.

8. A dispatcher for dispatching data packets to a service control engine (SCE) in a plurality of SCEs in a communication network, the dispatcher comprising:
   in an upstream direction of a data flow:
      a first network interface configured to receive a data packet from the communication network;
      a second network interface coupled to an SCE in the plurality of SCEs;
      dispatching logic configured to:
         (a) hash a source address contained in the data packet to identify the SCE in the plurality of SCEs, and
         (b) dispatch the data packet on a first Virtual Local Area Network (VLAN) via the second network interface to the correspondingly identified SCE to perform deep packet inspection of the data packet; and
      a third network interface coupled to the SCE and configured to receive the data packet from the SCE on a second VLAN;
   in a downstream direction of the data flow:
      a fourth network interface configured to receive a second data packet from the communication network, wherein the dispatching logic is further configured to:
         (a) hash a destination address contained in the second data packet to identify the SCE in the plurality of SCEs, and
         b) dispatch the second data packet to the correspondingly identified SCE on the second VLAN via the third network interface to perform deep packet inspection of the second data packet,
   the dispatching logic is further configured to dispatch packets associated with the same data flow to the same SCE.

9. A dispatcher as defined in claim 8 wherein the dispatching logic is further configured to:
   (a) identify a physical data link from the hashed source address and
   (b) dispatch the data packet to the correspondingly identified SCE via the physical data link.

10. A dispatcher as defined in claim 9 wherein the dispatching logic is further configured to dispatch the data packet to the correspondingly identified SCE on a trunk carried by the physical data link.

11. A dispatcher as defined in claim 10 wherein the trunk is an Institute of Electrical and Electronics Engineers (IEEE) 802.1Q trunk.

12. A dispatcher as defined in claim 8 further comprising:
   a supervisor engine, wherein the second network interface is further configured to receive the second data packet from the correspondingly identified SCE on the first VLAN, and the supervisor engine is configured to forward the second data packet received from the correspondingly identified SCE to a destination associated with a destination address contained in the second data packet.

13. An apparatus for dispatching data packets to a service control engine (SCE) in a plurality of SCEs in a communication network, the apparatus comprising:
   in an upstream direction of a data flow:
      means for receiving a data packet from the communication network;
      means for hashing a source address contained in the data packet to identify an SCE in the plurality of SCEs that is to receive the data packet;
      means for dispatching the data packet on a first Virtual Local Area Network (VLAN) to the correspondingly identified SCE to perform deep packet inspection of the first data packet; and
      means for receiving the data packet from the correspondingly identified SCE on a second VLAN; and
      means for forwarding the data packet received from the correspondingly identified SCE to a destination associated with a destination address contained in the data packet
   in a downstream direction of the data flow:
      means for receiving a second data packet from the communication network;
      means for hashing a destination address contained in the second data packet to identify the SCE in the plurality of SCEs;
      means for dispatching the second data packet to the correspondingly identified SCE to perform deep packet inspection of the second data packet on the second VLAN;
      means for receiving the second data packet from the correspondingly identified SCE on the first VLAN; and
      means for forwarding the second data packet received from the correspondingly identified SCE to a destination associated with the destination address contained in the second data packet
   such that packets associated with the same data flow are dispatched to the same SCE.

14. An apparatus as defined in claim 13 wherein:
   the identifying means includes means for identifying a physical data link from the hashed source address contained in the data packet, and
   the dispatching means includes means for dispatching the data packet on the first VLAN to the correspondingly identified SCE via the physical data link.

15. An apparatus as defined in claim 13 wherein:
   the means for identifying includes means for identifying a physical data link from the hashed destination address contained in the second data packet, and
   the means for dispatching the second data packet to the correspondingly identified SCE includes means for dispatching the second data packet to the correspondingly identified SCE via the identified physical data link.

* * * * *